March 10, 1953
S. RUBEN
2,631,181
ALKALINE DRY CELL
Filed Nov. 16, 1948
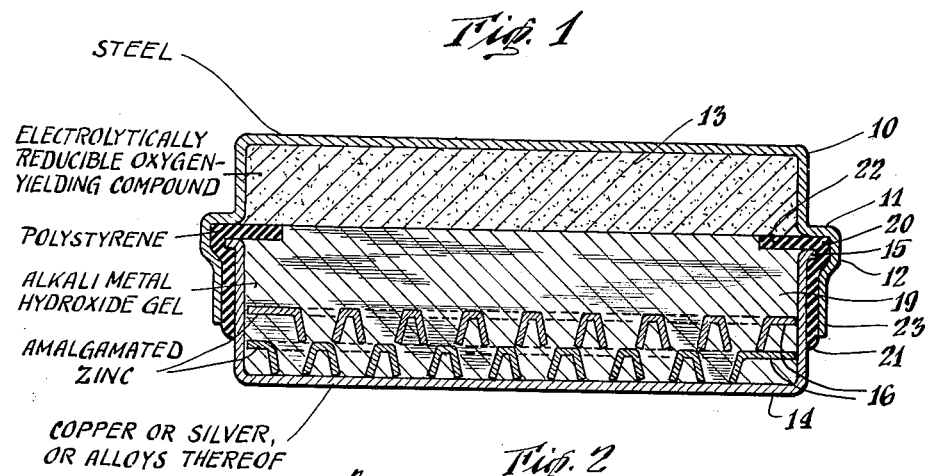
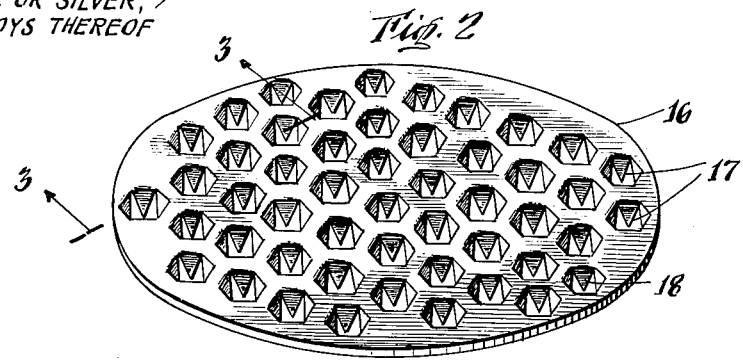
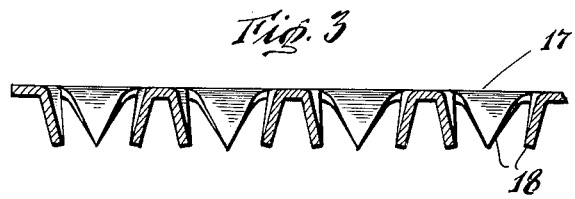
INVENTOR.
Samuel Ruben
BY
Nicholas Laugel
ATTORNEY Patented Mar. 10, 1953

2,631,181

UNITED STATES PATENT OFFICE 2,631,181

ALKALINE DRY CELL

Samuel Ruben, New Rochelle, N. Y.

Application November 16, 1948, Serial No. 60,265

6 Claims. (Cl. 136—111)

1

This invention relates to electrochemical cells for the generation and storage of electrical energy and, more particularly to an alkaline dry cell of novel and improved character.

In my U. S. Patent 2,422,045, relating to an alkaline dry cell, there is disclosed a sealed alkaline primary cell having an amalgamated zinc anode, a cathode formed of a conductive body containing an electrolytically reducible oxygen-yielding compound (such as mercuric or silver oxide) and an immobilized electrolyte comprising an aqueous solution of an alkali metal hydroxide (such as potassium hydroxide) containing a substantial quantity of alkali metal zincate. The presence of the zincate in the electrolyte, in combination with other features described in the said patent, presents or strongly inhibits any tendency for a chemical hydrogen-generating reaction $(Zn+2H^+ \rightarrow Zn^{++}+H_2)$ to take place between the electrolyte and the zinc anode when the cell is stored prior to use as well as during active use. These factors have made possible a sealed alkaline dry cell which does not generate appreciable gas or leak electrolyte during shelf life or when in use.

In my co-pending application Serial No. 468,386, filed December 9, 1942, now Patent No. 2,463,565 dated March 8, 1949 and in my co-pending application Serial No. 752,857, filed June 6, 1947, now Patent No. 2,536,699 dated January 2, 1951, I have disclosed and claimed a primary cell comprising a pair of electrodes and a solid crystalline alkaline electrolyte interposed between and in contact with said electrodes.

In my co-pending application Serial No. 671,200, filed May 21, 1946, I have disclosed and claimed a dry primary cell of flat or button-like construction comprising an anode of compressed metal powder and an electrolyte element for the cell which may be formed of an aqueous alkaline solution which is immobilized by a compatible addition agent, preferably a material which converts the electrolyte into a gel, such as sodium carboxy-methyl cellulose.

In my co-pending application Serial No. 682,734, filed July 11, 1946, now Patent No. 2,542,575 dated February 20, 1951, I have disclosed and claimed alkaline dry cells comprising an amalgamated zinc anode, a pressed cathode-depolarizer body, and a body of alkaline electrolyte gel interposed between said anode and cathode. Preferably, the zinc anode is surrounded by and is in contact with a cell container formed of a metal inert to the electrolyte and having a low contact potential to zinc. The quantity of zinc

2 in the anode is balanced with the depolarizing capacity of the cathode so that both anode and cathode are consumed substantially simultaneously. In practice, a slight excess of oxide is used when such a cell combination is employed with an alkaline electrolyte. This makes possible the provision of a sealed alkaline dry cell which is free of any tendency to electrolyte leakage or appreciable gas generation during shelf life, current generating life and at end of life. Such a cell can safely be used in any sort of equipment without hazard or damage due to electrolyte leakage or cell disintegration, even if the cell is allowed to remain in the equipment long after the end of its useful life.

In my co-pending application Serial No. 793,406, filed December 23, 1947, I have disclosed and claimed an alkaline dry cell comprising a gel electrolyte of special composition and characteristics and a novel type of anode electrode having a disc-shaped honeycomb structure characterized by a high surface-to-volume ratio.

In my co-pending applications Serial Nos. 729,707 and 32,670, filed February 20, 1947 and June 12, 1948, respectively, and in my co-pending application Serial No. 35,831, filed June 29, 1948, now Patent No. 2,554,504 dated May 29, 1951, I have disclosed and claimed various types of secondary or rechargeable cells.

The present application is related to my aforesaid Patent No. 2,422,045, and is a continuation-in-part of all of my aforesaid co-pending applications and constitutes an improvement thereover.

An object of the present invention is to improve electrochemical cells for the generation and storage of electrical energy, more particularly to improve alkaline dry cells.

Other objects and advantages will be apparent from the following description and claims.

In its broad aspects, the present invention contemplates an electrochemical cell for the generation and storage of electrical energy, such as a primary or a secondary cell, comprising an amalgamated anode in the form of a perforated metal disc of special characteristics, a cathode formed of a coherent conductive body containing a cathode depolarizer, and an electrolyte of generally solid consistency, for example, one in the form of a gel formed of an aqueous solution of an alkali metal hydroxide, such as potassium hydroxide, immobilized by addition of a suitable gelling agent, such as sodium carboxy-methyl cellulose.

In the drawings:

Fig. 1 is a sectional view of a flat dry cell embodying features of the present invention;

Fig. 2 is a perspective view of one of the anode elements or discs of the cell shown in Fig. 1; and Fig. 3 is a sectional view taken on line 3—3 of Fig. 2.

Referring now to the drawing, illustrating an embodiment of the invention into an alkaline primary dry cell, reference numeral 10 denotes a shallow cup-shaped cathode container or shell formed of a suitable inert metal, such as steel. Container 10 is provided with an outwardly extending shoulder 11 beyond which its diameter is slightly enlarged, as this is indicated at 12. Within this container, there is provided cathode-depolarizer body 13 comprising an electrically conducting electrolytically-reducible oxygen-yielding compound having a smaller quantity of inert material of higher conductivity admixed therewith. The cathode body may be in the form of a prepressed pellet of 95% mercuric oxide and 5% graphite which is inserted into the cathode container and is consolidated therein by a higher pressure so that its exposed surface is substantially flush with shoulder 11.

Anode container 14 is the form of a shallow cup having an outwardly flaring flange 15 at its edge, formed of a metal inert to the electrolyte and having, when amalgamated, a low contact potential with respect to zinc. Examples of suitable materials for the anode container are copper, silver, silver-plated copper, or alloys of copper or silver with other metals. Particularly good results are obtained with anode containers formed of commercial bronze which is an alloy of 90% copper and 10% zinc. Before assembling the cell, the inner surface of bronze can 14 is amalgamated, for example, by pouring into it an acidified 3% mercuric nitrate solution having a temperature of 53° C. and maintaining the solution therein for five minutes. After amalgamation, the solution is poured off and the can is washed and dried.

In anode container 14, there are a pair of amalgamated zinc anode discs 16, having their circumferential edges forcefitted into the container thereby forming with the inner surface thereof a permanent tight fit and an electrical contact of low resistance. Good electrical contact of the anode discs 16 and container 14 is further assured by the amalgam bond formed therebetween upon their assembly.

As will be best observed in Figs. 2 and 3, the anode discs 16 are in the form of discs punched from suitable anode metal, such as sheet zinc, and having a large number of small apertures 17 of a polygonal, for example hexagonal shape provided therein. The apertures are so formed that the material removed from the body of the disc is caused to protrude at one side of the disc and to surround the aperture in the configuration of a frustoconical surface 18. Thus, the entire structure could be approximately described as a plate having a large number of proturberances on one face thereof, and an aperture at the top of each of said protuberances. Generally speaking, a structure of this type displays a certain similarity to a grater employed in the culinary arts for grating potatoes, cheese, and the like, and for this reason sometimes will be referred to in the following description and claims as a "grater-type" anode. While in the illustrated form of this anode all of the protuberances thereof extend in the same direction, it is also possible to have some of them extend in one direction and the remainder thereof extend in the opposite direction. Considerable variation is also possible in the shape of the apertures which may be square, hexagonal, circular, etc. Likewise, the number of anode discs used in a particular cell may be larger than two or it may be only one.

The novel anode electrodes of the invention provide various important advantages. Thus, as a result of their perforated or foraminous character, they may be in contact with the electrolyte at both faces thereof or may be completely embedded in an immobilized electrolyte body, thereby assuring a high surface-to-volume ratio. This ratio is further improved by the added surface constituted by the protuberances surrounding each aperture. The said protruding portions are also capable of functioning as spacing means which may positively space the anode discs from each other and from the bottom of the anode container. Moreover, the protruding portions greatly increase the mechanical strength of the structure and to a substantial extent compensate for the embrittlement due to amalgamation. Finally the grater-type anode discs may be readily manufactured on a quantity production scale at a low cost.

Anode discs 16 are force-fitted in container 14 so that their protruding apertured portions 18 are downwardly directed whereby they are positively spaced from each other and from the bottom of the container. The container is completely filled out with a body 19 of alkali metal hydroxide electrolyte gel which surrounds and embeds the anode discs and thus fully utilizes their entire surface. The composition and preparation of this electrolyte gel will be more fully described as the description proceeds.

Around the flanged edge 15 of anode container there is stretched a ring or grommet 20 of polystyrene, or some other suitable elastomer, having a downwardly depending cylindrical body portion 21 and an inwardly extending flange portion 22. This ring or grommet, as a result of its novel shape, is capable of performing two different functions. Its body portion 21 is compressed between the cooperating terminal portions of the anode and the cathode containers so that upon radially crimping the cathode container thereon, as indicated at 23, it will provide an airtight seal for the cell. As to its flange portion 22, this extends inwardly to an extent greater than any shrinkage of gel electrolyte body 19 that may occur during the useful life of the cell. As is more fully set forth in my aforesaid co-pending application Serial No. 671,200, during operation of cells of the described general type, water is withdrawn from the electrolyte gel body causing it to shrink. Also, as a result of progressive reduction of the depolarizer, particles thereof could drop into the interspace between the anode container wall and the shrunken gel electrolyte body, causing detrimental secondary action. This difficulty is particularly serious where the active depolarizer agent is mercuric oxide which is gradually reduced to metallic mercury. This metallic mercury, in the absence of any protective means, would run down into the interspace of anode container and gel body and would short-circuit the cell. All of these difficulties are completely eliminated by the inwardly extending flange portion 22 of sealing grommet 20.

Preferably, the quantity of zinc in the anode discs 16 is balanced with the depolarizing capacity of the cathode so that both anode or cathode are consumed simultaneously or so that the anode is practically completely consumed before the depolarizer is fully exhausted.

In quantity production, the zinc anode discs, with the protruding portions and apertures on one side of the disc, are punched out from zinc strip of suitable thickness. After degreasing, the discs are placed in a glass or porcelain-lined tumbling barrel of such shape as to produce a rolling action on the discs. Provision is made to maintain the barrel at 80° C. and for the addition and removal of processing and washing liquids. The removal of such liquids by decanting is satisfactory in most cases.

The discs are covered with a 15% ammonium chloride solution and are maintained at 80° C. A solution containing 10% bichloride of mercury and 2% of ammonium chloride is prepared and filtered. This solution is slowly added to the zinc discs during tumbling, and tumbling is continued for 30 minutes at 80° C. The preferred quantity of the solution is such as contains about 14 grams of bichloride of mercury for each 100 grams of zinc. After the tumbling and amalgamation are completed, the discs are washed and dried. The washed and dried discs are stored in an oven at 60° C. for several hours to further diffuse the mercury through the body of the discs and to render the amalgamated discs less brittle.

One suitable electrolyte for the cell is formed of:

| | Grams |
|---|---|
| Chemically pure potassium hydroxide (88% KOH) | 100 |
| Chemically pure zinc oxide | 16 |
| Water | 100 |

The sodium carboxy-methyl cellulose is added to the electrolyte in the proportion of 5 grams per 100 ml. of the electrolyte. The sodium carboxy-methyl cellulose is crushed and screened through a 40 mesh screen and is added slowly to the solution with constant stirring. This forms a viscous suspension which can be converted to a stiff gel by heating to a temperature of at least 100° C. and preferably to just below the temperature at which the mixture starts to boil. In most cases, this will be about 117°–120° C. at which point a clear liquid solution is obtained which, upon cooling, will form a clear, homogeneous, self-supporting gel. For cell operation at extreme low temperature, the zinc oxide may be omitted.

In assembling the cell, the hot electrolyte gel solution is poured into the anode subassembly, comprising anode container 14, having grommet 20 around its flange 15 and having the pair of anode discs 16 force-fitted in the bottom thereof. Pouring is continued until the container is filled up to the level of the top of the grommet. To prevent premature solidification of the hot gel electrolyte liquid, the anode subassembly is preheated to 80° C.

When this anode subassembly is cooled to room temperature and the gel electrolyte has solidified therein, it is combined with the cathode subassembly comprising cathode container 10 and cathode depolarizer 13 and is air-tightly sealed by crimping the cathode container at 23.

As an alternative procedure, the electrolyte is provided in the preliminary form of discs or slugs. In preparing electrolyte discs or slugs, the preferred method is to pour the clear solution of the hot liquid electrolyte containing the gelling agent into a suitable mold where it gels into a flat sheet. After cooling, the stiff gel sheet is removed from the mold and electrolyte discs are punched from it. One such electrolyte disc is placed in the anode subassembly just described, on top of the upper perforated zinc anode disc 16, and the assembly is placed in an oven maintained at 110° C. At this temperature, the gel disc rapidly melts into the apertures of the zinc discs and completely impregnates the entire unit, allowing a high degree of uniformity between cells and avoiding straining the somewhat brittle amalgamated anode discs. Upon cooling and consolidation of the electrolyte gel in the anode subassembly, the cell is assembled and sealed in the manner described in the foregoing.

In a practical cell embodying the invention, the cathode container was a steel can 0.152" deep, measured from its bottom to the shoulder and had an inner diameter of 1.060" at the shoulder. The cathode-depolarizer composition comprised a mixture of 95% by weight of mercuric oxide (HgO) and of 5% by weight of micronized graphite. This mixture was prepelleted at a pressure of 1200 pounds per square inch into a pellet 1.30" in diameter which was inserted into the steel can and was consolidated therein at a pressure of 30,000 pounds per square inch. The weight of the cathode depolarizer material and its graphite content were so adjusted that upon application of the consolidating pressure the depolarizer material was flush with or slightly below the shoulder of the can. Upon consolidation, the pellet thickness was 0.150", or 0.165" when measured together with the bottom wall thickness of the can.

The anode container or shell was formed of amalgamated copper or of amalgamated commercial bronze having the composition of 90% copper and 10% zinc. Its wall thickness was 0.02" and its overall height was 0.280".

The anode discs, of which two were used in the cell, were punched from zinc strip 0.024" thick. They had a diameter of 1.026", each having 55 square-shaped apertures 0.05" square punched therein. The displaced edges around each aperture were all protruding from one side to the extent of about 0.04" from the surface of the disc. After amalgamation, the weight of each disc was 4.7 grams. The anode discs were force-fitted into the anode shell to assure good and permanent electrical contact of low resistance therewith. The protruding portions of the discs surrounding the apertures were directed towards the bottom surface of the anode shell thereby positively spacing them from each other and from said surface.

The flanged grommet or ring having its body portion interposed between the cooperating terminal regions of the anode and cathode shells and having its flange portion extending inwardly was formed of polyethylene, although nylon or neoprene could be used with equal or similar results. Its outer diameter was 1.160", its inner diameter was 0.900" and its thickness 0.005".

The electrolyte gel body substantially extending to the top flange of the anode shell comprised 100 parts by weight of KOH, 16 parts by weight of ZnO and 100 parts by weight of $H_2O$, with an addition of 5 parts by weight of sodium carboxy-methyl cellulose as the gelling agent for each 150 parts by weight of the electrolyte. The weight of the electrolyte gel body was 4.2 grams.

A cell of the described character and construction had an open circuit voltage of 1.35 volts and a capacity of 3.2 ampere hours.

When employing a prefabricated gel disc in a cell of the described size in accordance with the alternative assembly procedure disclosed in the foregoing, the gel disc had a diameter of 0.970", a thickness of 0.270" and weighed 0.475 gram.

Although the present invention has been disclosed in connection with a few preferred embodiments thereof, variations and modifications may be resorted to by those skilled in the art without departing from the principles of the invention. Thus, while mercuric oxide is the preferred depolarizer, other depolarizers can be used. Where only very low current densities are needed, such as densities in the order of 10 milliamperes per square inch depolarizer surface, acid precipitated manganese dioxide, having 5% by weight of micronized graphite admixed thereto, may be used. Mercuric oxide, however, has the advantage of allowing the application of a wide range of current densities without polarization, for example, up to 100 milliamperes per square inch depolarizer surface.

The advantages of the perforated or grater-type anodes are not restricted to primary cells but are equally apparent in all types of electrochemical cells for the generation or storage of electrical energy. More particularly, I have obtained good results with anodes of the described character in the secondary or rechargeable cells disclosed and claimed in my aforesaid co-pending applications Serial Nos. 729,707, 32,670 and 35,831.

I consider all of these variations and modifications to be within the true spirit and scope of the present invention, as disclosed in the foregoing description and defined by the appended claims.

What is claimed is:

1. An anode element for electrical current producing cells comprising a plurality of metal plates each having a multiplicity of frustoconical protuberances distributed over the surface thereof and having an aperture at the top of each of said protuberances, said plates being maintained in parallel-spaced contacting relation by having the protuberances of each plate impinging upon the imperforate surface portions of the adjoining plate.

2. An anode element for electrical current producing cells comprising a plurality of metal discs each having a multiplicity of protuberances distributed over and extending from one face thereof and having an aperture at the top of each of said protuberances, the other face of each disc presenting a generally plane and perforate structure, said discs being maintained in parallel-spaced superposed relation by having the protuberances on one face of each disc in pressure contact with the plane face of the adjoining disc.

3. An anode element for primary and secondary cells comprising a plate of zinc having a multiplicity of openings therein, said openings being defined by punctured frusto-conical portions of said plate protuding from the plane of the plate on one face of said plate.

4. An anode element for primary cells comprising an amalgamated plate of zinc having its surface punctured at a multiplicity of points and its material forced out of its plane around each of said points in the same direction thereby constituting a foraminous structure of high surface-to-volume ratio.

5. An anode element for primary cells comprising an amalgamated zinc disc having a plurality of frusto-conical protuberances extending from only one face thereof, and an aperture at the top of each of said protuberances, said disc having its other face presenting a generally plane perforate appearance and constituting a honeycomb-like foraminous structure of high surface-to-volume ratio.

6. An anode element for electrical current producing cells constituted by a metal disc having a multiplicity of protuberances distributed over and extending from one face thereof and having an aperture at the top of each of said protuberances, said aperture defining a plane which is substantially parallel with and is spaced from the plane of the disc, the other face of said disc presenting a generally plane and perforate structure.

SAMUEL RUBEN.

REFERENCES CITED

The following references are of record in the file of this patent:

UNITED STATES PATENTS

| Number | Name | Date |
|---|---|---|
| 530,260 | De Mott | Dec. 4, 1894 |
| 764,813 | Kamperdyk | July 12, 1904 |
| 1,087,612 | Simmons | Feb. 17, 1914 |
| 1,138,363 | Elmes | May 4, 1915 |
| 1,436,616 | Walsh | Nov. 21, 1922 |
| 1,611,153 | Benner et al. | Dec. 21, 1926 |
| 1,613,585 | Dam | Jan. 4, 1927 |
| 1,737,130 | Storey et al. | Nov. 26, 1929 |
| 2,154,312 | MacCallum | Apr. 11, 1939 |

FOREIGN PATENTS

| Number | Country | Date |
|---|---|---|
| 607,099 | Great Britain | Aug. 25, 1948 |
| 677,424 | France | Mar. 7, 1930 |